United States Patent Office 3,496,201
Patented Feb. 17, 1970

3,496,201
PREPARATION OF DI- OR TRIALKYLTIN COMPOUNDS
Tadasu Tahara, Osaka-shi, Tadashi Takubo, Amagasaki-shi, and Tetsuya Matsunaga, Fuse-shi, Osaka-fu, Japan, assignors to Nitto Kasei Co., Ltd., Osaka, Japan, a corporation of Japan
No Drawing. Filed July 7, 1967, Ser. No. 651,681
Claims priority, application Japan, July 8, 1966, 41/44,091
Int. Cl. C07f 7/22
U.S. Cl. 260—429.7      9 Claims

ABSTRACT OF THE DISCLOSURE

This invention relates to the process for preparing di- or trialkyltin compounds and comprises treating a monoalkyltin oxide having the formula $$RSnO_{3/2}$$

wherein R is an aliphatic radical containing 1 to 12 carbon atoms with an aqueous alkali at 80°–200° C.

---

This invention relates to a process for preparing di- or trialkyltin compounds.

It is well known that a dialkyltin compound may be prepared by reacting directly a metallic tin with an alkyl halide in the presence of a catalyst. This procedure has the disadvantage that the formation of the by-products of a few percent of monoalkyltin compounds and a few percent of trialkyltin compounds is unavoidable.

Dialkyltin compounds are useful stabilizers for vinyl chloride resins. Trialkyltin compounds are effective insecticides, bactericides, fungicides, antiseptics, etc. On the other hand, monoalkyltin compounds are of no industrial use. The recovery of metallic tin from monoalkyltin compounds has been the only way of using the compounds.

It has been proposed in J. Proc. Roy. Soc. (London) 72, 7 (1903) to prepare a mixture of dimethyltin oxide and trimethyltin oxide by heating together a monomethyltin oxide and a caustic potash. This procedure has the disadvantages that the yields of the products are low; and that the proportion of the formed dimethyltin oxide, trimethyltin oxide, and tetramethyltin is indefinite. Therefore, there has hitherto been made no attempt to transform merely the monomethyltin oxide but other monoalkyltin oxides into a di- or trialkyltin compound with a view to making industrial use of the monoalkyltin oxides.

In view of the fact that the behavior of the methyl radicals in the monomethyltin oxides is quite free in the presence of an aqueous alkali, it has now been found that a di- or trialkyltin compound is prepared selectively in high yields.

It is an object of this invention to prepare alternatively di- or trialkyltin compounds in high yields from a monoalkyltin oxide and an aqueous alkali by properly selecting the reaction temperature.

In accordance with certain of its aspects this invention relates to a process for preparing a dialkyltin compound which comprises treating a monoalkyltin oxide having the formula $$RSnO_{3/2}$$

wherein R is an aliphatic radical containing 1 to 12 carbon atoms with an aqueous alkali at 80°–120° C.

In accordance with certain aspects this invention relates to a process for preparing a trialkyltin compound which comprises treating a monoalkyltin oxide having the formula $$RSnO_{3/2}$$

wherein R is an aliphatic radical containing 1 to 12 carbon atoms with an aqueous alkali at 140°–200° C.

In this invention, an aqueous alkali stands for a solution of alkali metal hydroxide, alkaline earth metal hydroxide, or ammonia. An aqueous alkali preferred from a economical point of view is a solution of sodium hydroxide. Monoalkyltin oxides are dispersed in these alkaline solutions, and the dispersed mixture is heated for 2–8 hours at 80°–120° C. to exclusively form a dialkyltin derivative and at 140°–200° C. to exclusively form a trialkyltin derivative.

Water is used as solvent of alkali. In case a monoalkyltin oxide is not so lyophilic with such an alkaline solution as to make the reaction smooth, a small amount of surface active agent may be added. The concentration of alkaline solution is not less than 5% by weight, preferably 10–60% by weight. The higher the concentration is, the more readily the reaction is carried out. The sufficient amount of alkali used is 1–10 equivalent weights per 1 equivalent weight of monoalkyltin oxide.

Di- or trialkyltin compounds which may be prepared according to the invention may be recovered in the form of the oxides by separating from the reaction mixture directly, or may be recovered in the form of dialkyltin dichlorides or trialkyltin chlorides by chlorinating the reaction mixture with a hydrochloric acid, and extracting dialkyltin dichlorides or trialkyltin chlorides from the reaction mixture in the presence of organic solvent. The thus obtained alkyltin compounds are high in purity, and may be used widely for industrial purposes.

Example 1

A reactor (500-cc. agitating type stainless steel autoclave) was charged with 51.5 g. of monoethyltin oxide and a solution of 34 g. of potassium hydroxide in 200 cc. of water, and the mixture was heated for 3 hours at 140°–145° C. Thereafter, it was allowed to cool to room temperature, and was well acidified with concentrated hydrochloric acid. The oily crude organotin chlorides formed were extracted with three 50 cc. portions of benzene, and the extracts were stripped of solvent, and then distilled under vacuum to yield 19.0 g. (79%) of triethyltin chloride of B.P. 90°–95° C. at 13 mm. Hg.

Example 2

The same reactor as employed in Example 1 was charged with 55.7 g. of mono-n-propyltin ovide and a solution of 24 g. of sodium hydroxide in 60 cc. of water, and the mixture was heated for 5 hours at 150°–160° C. Thereafter, it was allowed to cool to room temperature. The reaction mixture was treated in procedures similar to those of Example 1 to yield 21.8 g. (77%) of tri-n-propyltin chloride of B.P. 119°–122° C. at 12 mm. Hg.

Example 3

The same reactor as employed in Example 1 was charged with 60 g. of mono-n-butyltin oxide, 2.0 g. of sodium dodecyl benzene sulfonate, and a solution of 48 g. of sodium hydroxide in 90 cc. of water, and the mixture was heated for 4 hours at 148°–155° C. Thereafter, it was allowed to cool to room temperature. The reaction mixture was treated in procedures similar to those of Example 1 to yield 23.0 g. (78%) of tri-n-butyltin chloride of B.P. 135°–137° C. at 12 mm. Hg.

By the same technique, 19.8 g. (67%) of tri-n-butyltin chloride of B.P. 133°–137° C. at 12 mm. Hg was prepared from the same reactants as above except that the sodium hydroxide solution was replaced by a solution of 200 g. of barium hydroxide and 200 cc. of water.

Example 4

A 500-cc. three-necked reaction flask equipped with stirrer, reflux condenser and thermometer was charged with 60 g. of mono-n-butyltin oxide, and a solution of 40 g. of sodium hydroxide in 80 cc. of water, and the mixture was heated with stirring for 6 hours at 110°–120° C. Thereafter, it was allowed to cool to room temperature. The reaction mixture was treated in procedures similar to those of Example 1 to yield 31.0 g. (68%) of di-n-butyltin dichloride of B.P. 134°–138° C. at 12 mm. Hg.

Example 5

The same reactor as employed in Example 1 was charged with 76.7 g. of mono-n-octyltin oxide and 100 g. of 28% ammonium aqua, and the mixture was heated for 6 hours at 115°–120° C. Thereafter, it was allowed to cool to room temperature. The reaction mixture was treated in procedures similar to those of Example 1 to yield 38.0 (61%) of di-n-octyltin dichloride of B.P. 155°–161° C. at 0.1 mm. Hg.

Although this invention has been illustrated by reference to specific examples, numerous changes and modifications thereof which clearly fall within the scope of the invention will be apparent to those skilled-in-the-art.

We claim:

1. A process for preparing a di- or trialkyltin compound which comprises treating a monoalkyltin oxide having the formula $$RSnO_{3/2}$$

wherein R is an aliphatic radical containing 1 to 12 carbon atoms with an aqueous alkali at 80°–200° C.

2. A process for preparing a dialkyltin compound which comprises treating a monoalkyltin oxide having the formula $$RSnO_{3/2}$$

wherein R is an aliphatic radical containing 1 to 12 carbon atoms with an aqueous alkali at 80°–120° C.

3. A process as claimed in claim 2 wherein R is butyl.
4. A process as claimed in claim 2 wherein R is propyl.
5. A process as claimed in claim 2 wherein R is octyl.
6. A process for preparing a trialkyltin compound which comprises treating a monoalkyltin oxide having the formula $$RSnO_{3/2}$$

wherein R is an aliphatic radical containing 1 to 12 carbon atoms with an aqueous alkali at 140°–200° C.

7. A process as claimed in claim 6 wherein R is butyl.
8. A process as claimed in claim 6 wherein R is propyl.
9. A process as claimed in claim 6 wherein R is octyl.

References Cited

Pope et al.; J. Proceedings Royal Society (London), (1903), vol. 72, pp. 7–11, 260–429.7.

Druce: J. Chem. Society (1921), vol. 119, pp. 758–63.

Druce: J. Chem. Society (1922), vol. 121, pp. 1859–63.

Pfeiffer: Berichte (1902), vol. 35, pp. 3303–7.

DELBERT E. GANTZ, Primary Examiner

WERTEN F. W. BELLAMY, Assistant Examiner